United States Patent [19]

Giannuzzi

[11] Patent Number: 4,828,445

[45] Date of Patent: May 9, 1989

[54] SINGLE-PIECE PRE-SHAPED WALL ANCHOR

[76] Inventor: Louis N. Giannuzzi, 4 Shelter Dr., Cos Cob, Conn. 06807

[21] Appl. No.: 643,392

[22] Filed: Aug. 23, 1984

Related U.S. Application Data

[63] Continuation-in-part of Ser. No. 388,256, Jun. 14, 1982, abandoned.

[51] Int. Cl.$^4$ .................. F16B 15/00; F16B 15/08
[52] U.S. Cl. .................... 411/451; 411/446; 405/259
[58] Field of Search ............ 411/75, 259, 306, 392, 411/411, 447, 499, 508, 509, 510, 491, 451–454, 908; 405/259, 260; 403/405.1, 267

[56] References Cited

U.S. PATENT DOCUMENTS

| 372,844 | 11/1887 | Emerson et al. | 411/491 |
|---|---|---|---|
| 1,466,676 | 9/1923 | Stronach et al. | 411/497 |
| 2,256,401 | 9/1941 | Maze | 411/454 |
| 2,690,693 | 10/1954 | Campbell | 405/259 |
| 3,391,720 | 7/1968 | Morse | 411/259 |
| 3,495,494 | 2/1970 | Scott | 411/908 |
| 3,791,750 | 2/1974 | Cameron | 411/452 |
| 4,342,982 | 8/1982 | Plasko | 403/267 |

FOREIGN PATENT DOCUMENTS

| 210677 | 8/1960 | Austria | 411/306 |
|---|---|---|---|
| 2468024 | 5/1981 | France | 403/405 |
| 55-122918 | 9/1980 | Japan | 411/451 |
| 915732 | 7/1954 | United Kingdom | 411/456 |

Primary Examiner—Neill R. Wilson
Attorney, Agent, or Firm—Michael Ebert

[57] ABSTRACT

A one-piece wall anchor capable of being driven axially into a hole drilled in masonry to cause the inserted anchor to lodge securely therein to hold a fixture or other part against the masonry surface. The anchor is constituted by a shank formed of resilient material whose memory is such that when the shank is forcibly deformed, it seeks to maintain its original shape, the shank being integral with a drivable head and having a maximum cross section which is substantially equal to the diameter of the hole. The shank is pre-shaped to include at least one undulation which deviates from the longitudinal axis passing through the head to create a shank bend having a peak on one side of the shank and upper and lower bases on the other side thereof. When, therefore, the anchor is driven into the masonry hole, this force seeks to straighten out the bend, the resultant deformation thereof exerting outward pressures against large contact areas on the wall of the hole at the peak and at the bases of the bend, which multi-level pressures strongly resist axial withdrawal of the shank.

4 Claims, 1 Drawing Sheet

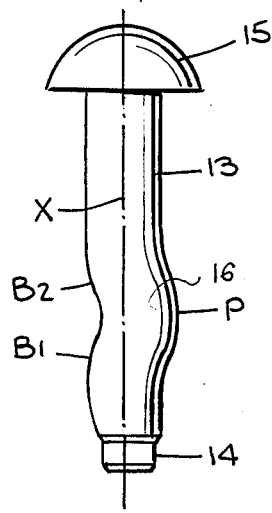
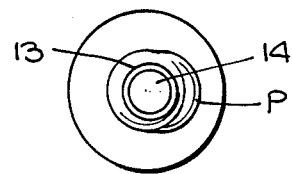
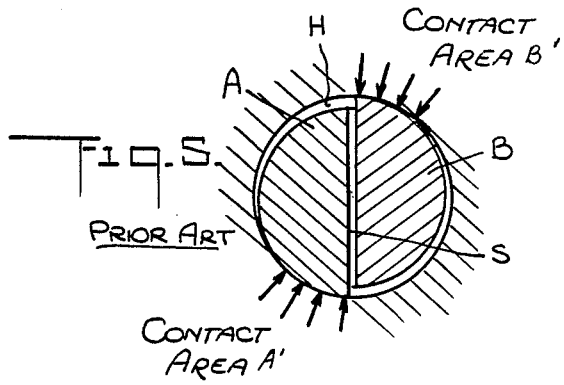
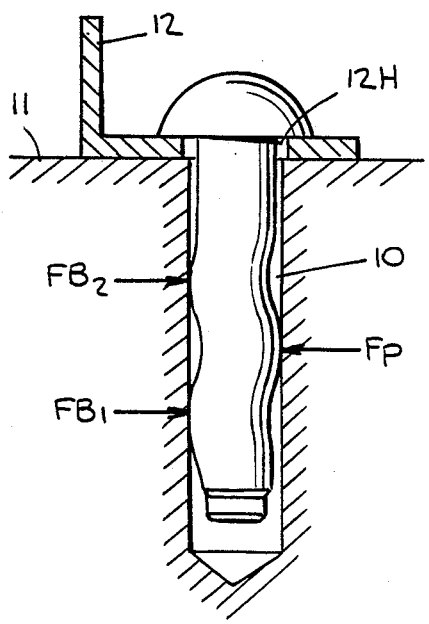
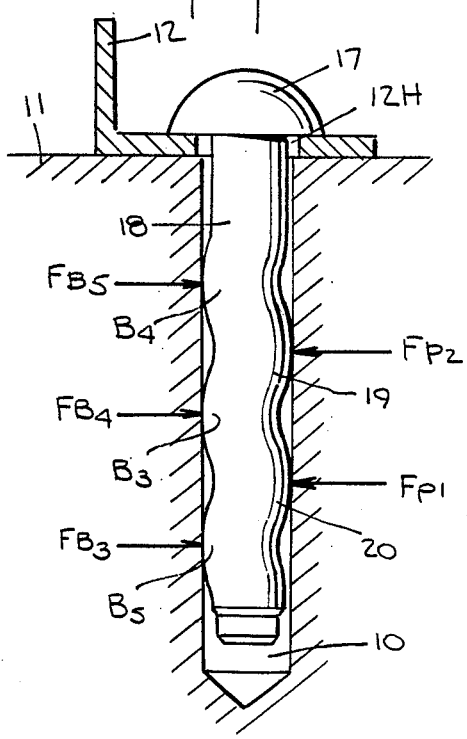

SINGLE-PIECE PRE-SHAPED WALL ANCHOR

RELATED APPLICATION

This application is a continuation-in-part of my co-pending application Ser. No. 388,256 of the same title, filed June 14, 1982, and now abandoned the entire disclosure of which is incorporated herein by reference.

BACKGROUND OF INVENTION

1. Field of Invention:

This invention relates generally to anchors for securing fixtures or other parts to masonry surfaces, and more particularly to a one-piece, pre-shaped anchor which when forcibly driven into a hole drilled into the masonry becomes securely lodged therein.

2. Prior Art:

It is frequently necessary to secure fixtures or other parts against the surface of masonry. The term "masonry" as used herein encompasses not only brickwork and concrete but all rigid non-metallic structural materials such as stone and plaster. The conventional practice for this purpose is to make use of an anchor bolt assembly which includes an expansible shell that is caused to expand when the bolt is turned by a wrench or other torque-producing tool, the expanded shell gripping the wall of the hole to securely retain the bolt therein.

Typical of such anchor bolt assemblies is the type disclosed in the Giannuzzi patent No. 3,766,819 in which a cone at the rear of the bolt is caused to advance toward an expansible shell encircling the bolt when the bolt is rotated, the expanded shell acting to anchor the bolt in the hole. Anchor bolt assemblies operating in a similar manner are disclosed in the patent No. to McIntyre, 4,056,037 and the Dempsey patent No. 2,988,950.

Quite apart from the fact that conventional anchor bolt assemblies are composed of two or more cooperating components and are relatively expensive to manufacture, are the difficulties often experienced in making installations with such assemblies.

On a major construction site, it is generally necessary to use literally hundreds or thousands of anchor bolts to secure such items as suspended ceilings, soffits and wall studding, or to make similar attachments requiring repetitive anchor bolt operation. In each of these, the bolt must be installed in a carefully drilled hole. The bolt must be properly inserted in the hole and then turned by a tool until the bolt is locked in the hole by its associated expansible shell. This requires a significant degree of care by the installer. A large number of anchor failures arise from unqualified installers who fail to drill an accurate hole or to adequately torque the anchor. Moreover, there is no way of knowing whether the anchor is not holding properly until it fails in service, and this may have tragic consequences.

Apart from the problem of improper installation, is the fact that with existing anchor bolts, the installation of each bolt is a time-consuming operation. Since at a given site, this operation must be repeated over and over again, the operator in the course of a working day is only able to install a limited number of anchor bolts. This adds substantially to construction site labor costs.

In order to reduce the time involved in installing anchor bolts, anchors have been proposed which are driven into pre-drilled masonry holes, thereby obviating the need to turn in the anchor bolt to expand a wedging shell. Thus the patent No. to Nillson, 3,894,469 discloses a nail-like anchor which when hammered into a hole has a weakened portion that is deformed by this action to effect the desire wedging. The Gutshall patent No. 3,518,915 also shows a one-piece expandable anchor. Other patents, such as Patruch No. 3,022,701, show two-piece driven anchors in which a nail-like element is hammered into an expansion sleeve. In these prior arrangements, the anchor bolt assembly still depends on an expansion element or equivalent means that is formed outwardly against the wall of the hole by the hammering action.

Also of prior art interest is the single piece anchor marketed under the trademark "Rawl Drive" by the Rawlplug Company, Inc., of New Rochelle, N.Y. This anchor has a resilient shank, an intermediate section of which is split into two half sections having a semi-circular cross-section. These are expanded in opposite directions in the plane of the split. The unsplit diameter of the shank is significantly smaller than the diameter of the masonry hole in which the anchor is to be installed, whereas the maximum diameter of the split section is somewhat greater than that of the hole.

In making a "Rawl Drive" anchor, one starts with an annealed piece of steel which is first cold headed into a simple rivet-like shape. In order to then split the intermediate section of the shank into two half sections and to expand these half sections in opposite directions in the plane of the split to create the desire bulge, one must heat treat the anchor to impart thereto sufficient hardness to react to the splitting tool; for otherwise, the then ductile metal will yield and will not split. After completion of the splitting and expansion operation, the anchor must again be heat treated to a spring-like temper to render the expanded split section resilient and compressible. Because of this relatively complex procedure, the "Rawl Drive" anchor is quite expensive to make.

When the "Rawl Drive" anchor is driven into a hole drilled in masonry, the expanded half sections thereof are compressed inwardly and straightened out. But because of the resilience of the half-sections, they seek to resume their normal expanded shape, thereby imposing an anchoring force on the wall of the masonry hole on opposite sides thereof. The remainder of the shank imposes no anchoring force on the drilled hole; hence whether the anchor is long or short, there is no substantial difference in the anchoring force.

Being axially split and expanded, the half sections of the shank only make contact with the surface of the hole in a region adjacent to the plane of the split. This provides mating contact of approximately 45 degrees on each split half, and the resultant holding power is low.

A serious drawback of the "Rawl Drive" anchor is that the bulge created by the split and expanded half sections has a maximum transverse dimension which is necessarily significantly greater than the diameter of the hole drilled in the masonry, and consequently is greater than the diameter of the mounting hole in the fixture to be attached to the masonry wall by the anchor bolt. Because a "Rawl Drive" anchor, before entering the masonry hole, must first pass through the mounting hole in the metal fixture, the use of conventional fixtures in conjunction with "Rawl Drive" anchors is precluded. That is to say, one cannot use the "Rawl Drive" anchor with a fixture whose mounting hole has a diameter which corresponds to that of the drilled hole, which is usually the case, for the Rawl Drive anchor cannot go through this mounting hole.

SUMMARY OF INVENTION

In view of the foregoing, the main object of this invention is to provide a one-piece, pre-shaped wall anchor which when hammered or otherwise forcibly inserted axially into a hole drilled in masonry is securely lodged therein.

Among the significant advantages of an anchor in accordance with the invention are (a) ease of insertion to facilitate high-speed installations, (b) an assured multi-level gripping action when the anchor is fully inserted in the hole, (c) a tight attachment of the fixture or other part held against the masonry surface, (d) a high level of holding power due to relatively large contact surface areas, and (e) an ability to go through the mounting hole of a fixture whose diameter corresponds to that of the hole drilled in masonry.

Also an object of the invention is to provide a low-cost, pre-shaped anchor which requires no more skill to install than it takes to drive in a nail with a hammer, thereby minimizing the possibility of a faulty installation.

More particularly, an object of this invention is to provide a pre-shaped anchor which may be fabricated of metal or synthetic plastic material and is capable of supporting relatively heavy loads against the masonry surface.

Also an object of this invention is to provide a one-piece anchor of the above type which may be mass-produced at low cost in a one machine operation, as distinguished from the Rawl Drive anchor which requires secondary machine operations and secondary heat treatment.

Briefly stated, these objects are attained by a one-piece anchor capable of being driven axially into a hole drilled in masonry to cause the inserted bolt to lodge securely therein to hold a fixture or other part against the masonry surface. The anchor is constituted by a shank formed of resilient material whose memory is such that when the shank is forcibly deformed it seeks to maintain its original shape, the shank being integral with a drivable head and having a maximum cross section which substantially equals the diameter of the hole.

The shank is pre-shaped to include at least one undulation which deviates from the longitudinal axis passing through the head to create a shank bend having a peak on one side of the shank and upper and lower bases on the other side thereof. When, therefore, the anchor is driven into the masonry hole, this force seeks to straighten out the bend, the resultant deformation thereof exerting outward pressures against large contact areas of the wall of the hole at the peak and at the bases, which multi-level pressures strongly resist axial withdrawal of the shank.

OUTLINE OF DRAWINGS

For a better understanding of the invention as well as other objects and further features thereof, reference is made to the following detailed description to be read in conjunction with the accompanying drawings, wherein:

FIG. 1 is an elevational view of a single-piece, pre-shaped single bend anchor in accordance with the invention;

FIG. 2 is a bottom view of the anchor;

FIG. 3 illustrates the anchor after it is driven into a hole drilled in masonry to attach a fixture against the masonry surface;

FIG. 4 is an elevational view of a single piece, pre-shaped, double-bend anchor in accordance with the invention after it is driven into a hole drilled in masonry; and FIG. 5 illustrates the areas of contact in a split anchor of the prior art type.

DESCRIPTION OF INVENTION

First Embodiment

Referring now to FIGS. 1 to 3, there is shown a one-piece, pre-shaped anchor in accordance with the invention for insertion in a hole 10 drilled in masonry 11, the anchor serving to attach a fixture 12 against the surface of the masonry, the fixture having a mounting hole 12H.

The anchor is constituted by a shank 13 fabricated of carbon or stainless steel, or other material having a circular cross section whose diameter is constant throughout the length of the shank, the tip 14 of the shank being of reduced diameter and chamfered to facilitate insertion in the hole 10. The diameter of hole 10 is equal to or slightly larger than the shank diameter. The upper end of shank 13 is integral with a rounded head 15.

Shank 13 is pre-shaped to create an undulation therein which deviates from the longitudinal axis X passing through the center of head 15 to create a curved bend 16 which is offset with respect to this axis. After the bend is formed, the shank is rendered resilient by tempering the metal at a temperature appropriate thereto to impart a memory thereto, such that when the shank is thereafter forcibly deformed, it seeks to recover its original shape.

When, therefore, the anchor is driven by a hammer or other means adapted to strike head 15, the shank 13, as it advances axially into masonry hole 10, forces bend 16 to straighten out, as shown in FIG. 3, in order to gain entry thereto. This forcible deformation of bend 16 causes the bend to exert outward pressures against the wall of hole 10 at different levels therein as it seeks to recover its original shape. These lateral pressures offer a considerable resistance to axial withdrawal of the shank from the hole. Hence the anchor, despite its simplicity and the absence of an expansible shell as in prior art anchors, is capable of supporting substantial loads on the masonry wall. The holding capacity depends, of course, on the dimensions and configurations of the bolt and the nature of its metal. In practice, anchors of this type may be designed for supporting loads as heavy as 2000 lbs. or greater.

In order to appreciate the fact that the pressures exerted against the wall of the hole are imposed at different levels, the nature of bend 16 must be further analyzed. Bend 16 has a peak P on one side of the shank. As shown in FIG. 1, peak P represents the point of maximum offset from the longitudinal axis X of the shank, this point being well outside the periphery of the drilled, non-tapped masonry hole for which the anchor bolt is intended.

The bend also has a lower base $B_1$ on the other side of the shank which is at a level below peak P, and an upper base $B_2$ which is at a level above peak P. When, therefore, as shown in FIG. 3, the shank is driven into masonry hole 10 to more or less straighten out the bend, the resilient bend, because it seeks to recover its original shape, exerts a first holding force $F_p$ at a level where its peak presses against the corresponding side of the wall of the hole, a second holding force $F_{B1}$ at a lower level where base $B_1$ of the bend presses against the opposite side of the hole, and a third holding force $F_{B2}$ at a higher level where the base $B_2$ of the bend presses against the opposite side of the wall of the hole.

Hence, the holding forces are not concentrated at one level as in prior art anchor bolts, but are distributed along the length of the hole to develop a far greater holding power. This distinction in the context of modern masonry materials is of signal importance.

Concrete in use 20 years ago had a compressive strength of about 2000 psi, whereas concretes of the type now in use range in compressive strength from 4000 to 10,000 psi. With increased compressive strength of the concrete, the surface of the untapped hole drilled therein becomes smoother and harder. Since the single-piece anchor makes surface contact with the drilled hole, the greater the amount of surface contact, the greater the holding power of the anchor. An anchor in accordance with the invention, as will be later explained, achieves almost 180 degrees surface contact at a minimum of three levels.

The invention is not limited to the use of high strength resilient metals, for it is applicable to any material inherently having a high degree of memory and capable of being shaped without rupturing the material or altering its spring-like properties. Thus, use may be made of nylon or polyolefin materials which are moldable in a single step operation to create both the head and shaped shank of the anchor.

While in the anchor shown in FIGS. 1 and 3, the shank is round and of uniform diameter, the shank may be tapered to facilitate insertion, but in that case the largest diameter of the shank must be substantially equal to that of the masonry hole. The degree of bend represents in a sense a compromise between that value providing the highest masonry holding power and that value which makes it reasonably easy using ordinary tools, to drive the anchor bolt in the hole. However, where a wall anchor is intended for use with a pneumatic or other high power mechanized driver, a greater degree of bend may be provided within the limits imposed by the nature of the metal.

Bolt Parameters:

In a pre-shaped wall anchor in accordance with the invention, the shank may, as in FIG. 1, have a constant diameter through its length that is slightly less than that of the pre-drilled masonry hole; or its diameter may be slightly larger, in which case the tip must be relieved to facilitate entry. Where the shank diameter is slightly larger than that of the masonry hole, a greater force is required to drive it in, the masonry hole then slightly giving way to permit insertion.

Also, in practice, the shank of the anchor may have a stepped formation, the diameter being reduced a short distance at the tip section to facilitate entry into the masonry hole, the shank diameter then increasing abruptly to a size about that of the hole. Or the shank diameter may vary from end to end. Thus the shank may taper from tip to head, or taper from tip to the midpoint of the shank and then reversely taper from this point to the head. And the cross section of the shank need not be circular but assume other geometric forms.

The shank undulations may be singular or multiple; they may be formed in one plane or in different planes with respect to each other; or the undulations may be created by a spiral formation of the shank. But whatever their form, the shape and magnitude of the undulations must be such that at all times, the head of the anchor maintains a proper relationship with the center ine of the hole, this being perpendicular to the face of the masonry. In this way, the horizontal and vertical force vectors which develop from the blow struck on the head of the anchor are so proportioned that the anchor will always be displaced axially into the hole and will not cause the anchor to bend at an angle to the center line and possibly break off. Improper shaping will cause the anchor head portion to lean away from the desired orientation.

The shank undulations must be such that they will not scrape and scavenge the walls of the drilled hole; for if this occurs, the entering anchor will chisel its own shape into the originally round hole. As a consequence, the reshaped hole will no longer compel the undulations to straighten out as the shank enters the hole, the memory of the shank is then not actuated and the holding power remains undeveloped. In short, the cross section dimensions of the shank play an important role as the effectiveness of the anchor, for an excessive size will render it impossible to drive the anchor in the hole, and improper sizing may cause chiseling of the hole and impair the operation of the anchor or reduce its holding power.

The shape of the anchor crown or head is preferably convex and free of angular edges so that those hammer blows which are not perfectly in line with the center line of the anchor will not bend or break off the head portion thereof.

It is also important to note that the bulge created by the undulation or undulations in the shank is offset with respect to the longitudinal axis X and is not symmetrical thereto, as in the "Rawl Drive" anchor. Hence the shank can snake its way through the mounting hole in the fixture and not, as in the case of a symmetrical bulge, have to be forced through this hole and thereby mutilate the hole. Normally, the mounting hole of the fixture has a diameter about the same as the masonry hole, and the shank of the present anchor has about the same diameter. The fact that the shank is undulating does not prevent its admission into the holes. But with the Rawl Drive anchor, the expanded bulge has a maximum diameter significantly greater than the masonry hole diameter, which creates a problem in getting this bulge through the fixture hole.

In order to appreciate why the contact area with the drilled hole is much greater than that obtainable with a "Rawl Drive" anchor, reference is made to FIG. 5. This shows a hole H drilled in masonry into which has been inserted a Rawl Drive anchor, an intermediate section of which is split at plane S to create two half sections A and B. These are expanded in opposite directions in the plane of the split to create a bulge causing the resilient half section A to press against the surface of the hole in a contact area A' on one side of the hole and causing the other half section B to press against the hole surface in a contact area B' on the opposite side of the hole.

These points of contact are adjacent the split and nowhere else. Each half section therefore has the ability to achieve only about 45 degrees of contact with the hole surface. Half sections A and B together make contact with about 90 degrees or only one quarter of the inner surface of the hole.

The reason why it is not possible in the Rawl Drive anchor to increase the diameter of the shank to bring about a larger contact area is that then the anchor would not work. If the shank diameter were as large as the hole diameter, the two split halves of the anchor would press against the mating surface of each other, and this would resist the ability of the two halves to move. To function as a spring, the half sections must be free to move in opposite directions as they seek to regain their original expanded shape.

In the present single piece anchor, the shank has a diameter which is about equal to that of the drilled hole. Therefore, when the undulated shank is driven into the hole, it straightens out and establishes surface contact at the bend and at the bases thereof on opposite sides of the anchor establishing approximately 160 degrees of contact area at each contact. Since 160 degree contact is established in the case of a single bend anchor at three contact areas and at three different levels, it has, therefore, 480 degrees of surface contact as compared to 90 degrees for the Rawl Drive anchor. With a double bend anchor an even greater surface contact is established.

Second Embodiment

In the embodiment of the anchor shown in FIG. 4, the anchor, which has a head 17 and a shank 18 which are essentially the same as those in FIG. 1 and is made in the same way, except that instead of a single undulation to create a single offset bend, shank 18 has two curved bends 19 and 20 in series. Because bend 19 flows into bend 20, the two bends share a common junction base $B_3$, bend 19 having an upper base $B_4$ and bend 20 having a lower base $B_5$.

In this double-bend wall anchor, the forces exerted by the shank on the wall of the drilled untapped hole in the masonry 11 are distributed in five distinct levels along the depth of the hole. Thus, there is a base force $F_{B3}$ at the lowest level, a peak for $F_{P1}$ at a higher level, a base force $F_{B4}$ at a still higher level, a peak force $F_{P2}$ at the level thereabove, and a base force $F_{B5}$ at the highest level. The base forces are in one side of the hole, and the peak forces are in the opposite side. These forces act in combination to provide a very high power anchor.

While there have been shown and described preferred embodiments of a single-piece pre-shaped wall anchor in accordance with the invention, it will be appreciated that many changes and modifications may be made therein without, however, departing from the essential spirit thereof. Thus the anchor, though intended for installation in masonry holes, can also be driven into a hole driven in any solid body.

I claim:

1. A one-piece, pre-shaped anchor bolt driven axially into an untapped round hole drilled in masonry to hold a fixture or other object having a mounting hole therein against the surface of the masonry, said mounting hole having a diameter substantially the same as that of the drilled hole; said bolt comprising a drivable head and a shank integral therewith formed of resilient material whose memory is such that when the shank is forcibly deformed it seeks to recover its original shape, said shank being pre-shaped to have at least one undulation which deviates from the longitudinal axis passing through the head and shank to create an arcuate bend therein having a peak which normally lies at a position well outside the periphery of the drilled hole and having an upper and a lower base, said shank having a cross section dimension which is substantially uniform throughout its length and is substantially equal to the diameter of the drilled hole to permit its undulation to snake through the mounting hole without the application of a driving force to the shank and to permit said shank to be driven axially into the drilled hole whereby when the shank is so driven this force acts to straighten out the bend to cause it to enter the drilled hole, the resultant deformation of the bend exerting substantial outward pressure against the wall of the drilled hole at a first level at which the peak contacts the wall of the drilled hole at one side thereof and at second and third levels at which the upper and lower bases contact the wall of the drilled hole on the other side thereof, which multi-level pressures exerted on the wall resist axial withdrawal of the shank from the drilled hole.

2. A one-piece anchor as set forth in claim 1, in which said shank is of metal that has been tempered after shaping to impart said resiliency thereto.

3. A one-piece anchor as set forth in claim 1, wherein said anchor shank has a single undulation and passes through the mounting hole of the fixture before entering said drilled hole to hold the fixture against the surface of the masonry.

4. An anchor as set forth in claim 3, wherein said mounting hole in the fixture has a diameter substantially the same as the diameter of the drill hole, and said shank has about the same diameter, whereby the undulating shank can snake its way through the mounting hole.

* * * * *